US011823112B2

(12) United States Patent
Mezaael et al.

(10) Patent No.: US 11,823,112 B2
(45) Date of Patent: Nov. 21, 2023

(54) FLEET TRIGGER-BASED INCENTIVES WITH BLOCKCHAIN

(71) Applicant: FORD GLOBAL TECHNOLOGIES, LLC, Dearborn, MI (US)

(72) Inventors: Abraham Mezaael, Southfield, MI (US); Thomas Woloszyn, Northville, MI (US); Shaheer Ahmed, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/676,481

(22) Filed: Feb. 21, 2022

(65) Prior Publication Data

US 2022/0180288 A1 Jun. 9, 2022

Related U.S. Application Data

(62) Division of application No. 16/212,050, filed on Dec. 6, 2018, now abandoned.

(51) Int. Cl.
| | |
|---|---|
| *G06Q 30/02* | (2023.01) |
| *G06Q 10/0639* | (2023.01) |
| *G06F 16/27* | (2019.01) |
| *H04L 9/06* | (2006.01) |

(Continued)

(52) U.S. Cl.
CPC ....... *G06Q 10/06398* (2013.01); *G06F 16/27* (2019.01); *G07C 5/02* (2013.01); *H04L 9/0637* (2013.01); *H04L 9/0643* (2013.01); *H04L 9/50* (2022.05)

(58) Field of Classification Search
CPC ...... G06Q 10/06398; G07C 5/02; H04L 9/50; H04L 2209/84
See application file for complete search history.

(56) References Cited

U.S. PATENT DOCUMENTS

| | | |
|---|---|---|
| 9,619,949 B2 | 4/2017 | Rood |
| 10,445,758 B1 | 10/2019 | Bryer et al. |
| 10,833,843 B1 * | 11/2020 | Vijayvergia .......... H04L 9/3242 |

(Continued)

OTHER PUBLICATIONS

"Blockchain could revolutionize how we share data, buy and sell cars" (Huetter, John; published Mar. 19, 2018 at https://www.repairerdrivennews.com/2018/03/19/blockchain-could-revolutionize-how-we-share-data-buy-and-sell-cars/) (Year: 2018).*

(Continued)

*Primary Examiner* — James M Detweiler
(74) *Attorney, Agent, or Firm* — Joseph Zane; Brooks Kushman P.C.

(57) ABSTRACT

A server including an interface configured to communicate with a blockchain network having a plurality of nodes including a vehicle, and a first entity; and a processor, programmed to receive a plurality of trigger events of a first cluster broadcasted by the vehicle to the blockchain network, receive a first request from the first entity to access the plurality of trigger events of the first cluster, send a first key to the first entity to allow the access to the plurality of trigger events of the first cluster, receive a plurality of trigger events of a second cluster broadcasted by the vehicle to the blockchain network, receive a second request from the first entity to access the plurality of trigger events of the second cluster, and decline the second request.

13 Claims, 4 Drawing Sheets

(51) Int. Cl.
*G07C 5/02* (2006.01)
*H04L 9/00* (2022.01)

(56) References Cited

U.S. PATENT DOCUMENTS

| | | |
|---|---|---|
| 2010/0042340 A1 | 2/2010 | Piszko |
| 2011/0161143 A1 | 6/2011 | Tajima |
| 2012/0095920 A1 | 4/2012 | McQuade et al. |
| 2015/0227890 A1 | 8/2015 | Bednarek et al. |
| 2016/0170733 A1 | 6/2016 | Martin et al. |
| 2017/0323244 A1* | 11/2017 | Rani ................ G07C 5/02 |
| 2017/0345314 A1 | 11/2017 | Godfrey et al. |
| 2018/0091596 A1* | 3/2018 | Alvarez ............ H04L 63/0428 |
| 2018/0197349 A1 | 7/2018 | Oesterling et al. |
| 2018/0204213 A1* | 7/2018 | Zappier ............ H04L 9/3239 |
| 2020/0073864 A1* | 3/2020 | Jo ................... G06F 21/64 |
| 2020/0126321 A1* | 4/2020 | Swearingen ......... G07C 5/02 |
| 2020/0139984 A1 | 5/2020 | Ronnow et al. |

OTHER PUBLICATIONS

Beach, Jim, Blockchain Shows Promise for Trucking, Fleet Management, Dec. 15, 2017, pp. 1-9.
Burnett, Rich, Easing America's Truck Driver Shortage Through Blockchain, Fleetowner, Aug. 29, 2018, pp. 1-3.

* cited by examiner

FLEET TRIGGER-BASED INCENTIVES WITH BLOCKCHAIN

CROSS-REFERENCE TO RELATED APPLICATIONS

This application is a division of U.S. application Ser. No. 16/212,050 filed Dec. 6, 2018, the disclosure of which is hereby incorporated in its) entirety by reference herein.

TECHNICAL FIELD

The present disclosure is generally related to a vehicle activity tracking system. More specifically, the present disclosure is related to a vehicle event tracking system using blockchain technology.

BACKGROUND

Many commercial fleet companies actively monitor their fleet vehicles and adjust compensation for drivers accordingly based on the drivers' operating activities such as productivity, safe driving, and/or vehicle maintenance. Blockchain technology has been developed, and the popularity of blockchain has been increasing due to the robustness and reliability of the technology.

SUMMARY

In one or more illustrative embodiment of the present disclosure, a vehicle includes a controller, programmed to responsive to detecting occurrence of a condition specified by a pre-defined trigger, generate a trigger event for the condition and send the trigger event to a blockchain network having multiple nodes; and responsive to receiving a validation from a node of the blockchain network, add a block for the trigger event to a distributed ledger stored locally.

In one or more illustrative embodiment of the present disclosure, a method for a vehicle includes detecting a pre-defined trigger being matched via a signal received from a vehicle sensor; generating a trigger event based on the matching trigger; broadcasting the trigger event to a blockchain network having multiple nodes via a telematics control unit (TCU) through a wireless connection; receiving a validation key for the trigger event from at least one node of the blockchain network; generating a new block incorporating the trigger event based on a previous block; and adding the new block to a distributed ledger stored within the vehicle.

In one or more illustrative embodiment of the present disclosure, a non-transitory computer-readable medium includes instructions that, when executed by a processor of a vehicle, cause the vehicle to detect a pre-defined trigger being matched via a signal received from a vehicle sensor; generate a trigger event based on the matching trigger; encrypt the trigger event using a key to generate an encrypted trigger event; broadcast the encrypted trigger event to a blockchain network having multiple nodes via a TCU through a wireless connection; receive a validation key for the trigger event from at least one node of the blockchain network; generate a new block incorporating the trigger event based on a previous block; and add the new block to a distributed ledger stored within the vehicle.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The present disclosure generally provides for a plurality of circuits or other electrical devices. All references to the circuits and other electrical devices, and the functionality provided by each, are not intended to be limited to encompassing only what is illustrated and described herein. While particular labels may be assigned to the various circuits or other electrical devices, such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programed to perform any number of the functions as disclosed.

The present disclosure, among other things, proposes a vehicle event monitoring system. More specifically, the present disclosure, proposes a vehicle event monitoring system utilizing blockchain.

Figure 1:
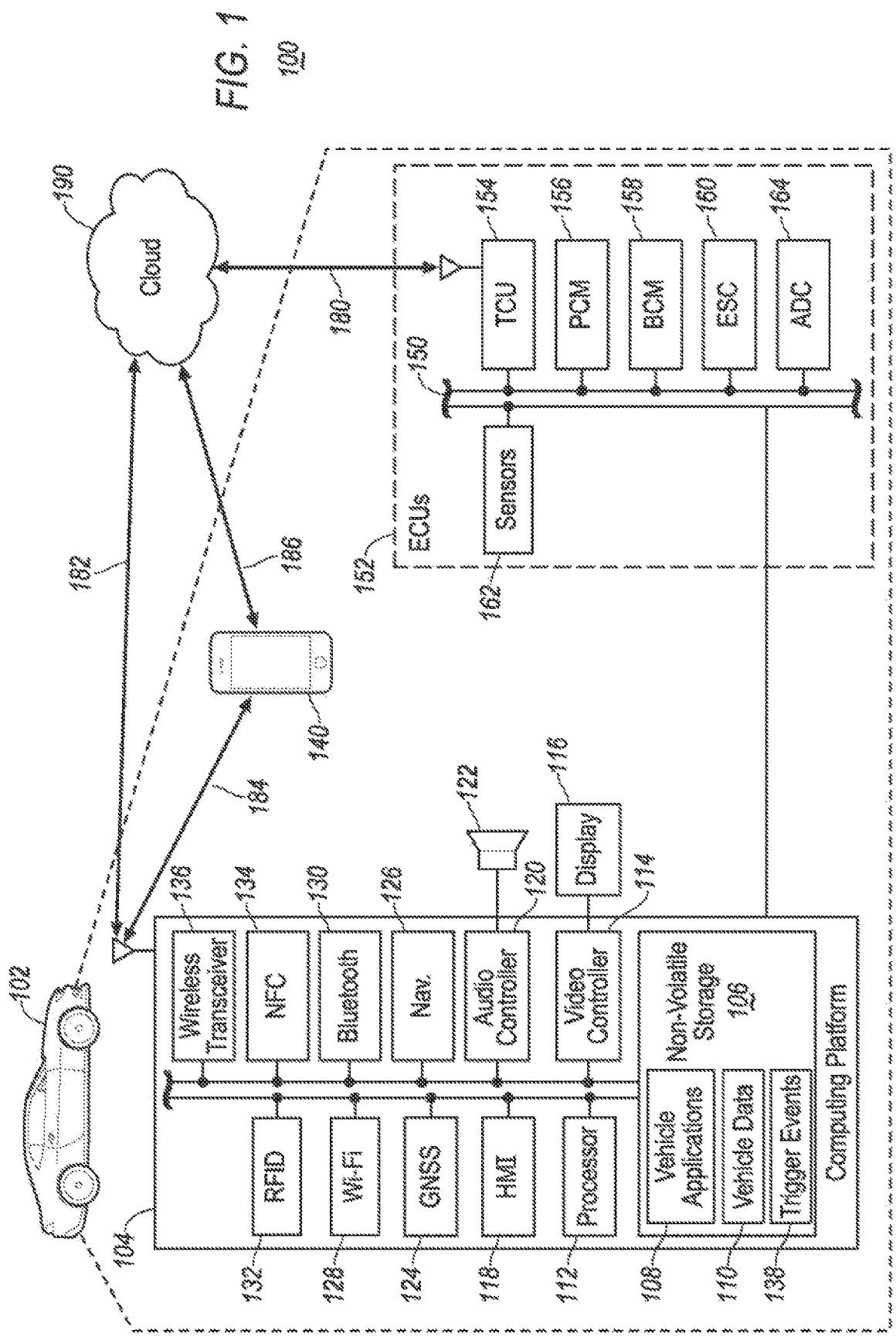
FIG. 1 illustrates an example block topology of a vehicle system of one embodiment of the present disclosure.

Referring to FIG. 1, an example block topology of a vehicle system 100 of one embodiment of the present disclosure is illustrated. A vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be battery electric vehicle (BEV), a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV), a boat, a plane or other mobile machine for transporting people or goods. As an example, the system 100 may include the SYNC system manufactured by The Ford Motor Company of Dearborn, Mich. It should be noted that the illustrated system 100 is merely an example, and more, fewer, and/or differently located elements may be used.

As illustrated in FIG. 1, a computing platform 104 may include one or more processors 112 configured to perform instructions, commands, and other routines in support of the processes described herein. For instance, the computing platform 104 may be configured to execute instructions of vehicle applications 108 to provide features such as navigation, trigger event detecting, event reporting, and wireless communications. Such instructions and other data may be maintained in a non-volatile manner using a variety of types of computer-readable storage medium 106. The computer-readable medium 106 (also referred to as a processor-readable medium or storage) includes any non-transitory medium (e.g., tangible medium) that participates in providing instructions or other data that may be read by the processor 112 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants/users to interface with the computing platform 104. For example, the computing platform 104 may receive input from human-machine interface (HMI) controls 118 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.).

The computing platform 104 may also drive or otherwise communicate with one or more displays 116 configured to provide visual output to vehicle occupants by way of a video controller 114. In some cases, the display 116 may be a touch screen further configured to receive user touch input via the video controller 114, while in other cases the display 116 may be a display only, without touch input capabilities. The computing platform 104 may also drive or otherwise communicate with one or more speakers 122 configured to provide audio output to vehicle occupants by way of an audio controller 120.

The computing platform 104 may also be provided with navigation and route planning features through a navigation controller 126 configured to calculate navigation routes responsive to user input via e.g., the HMI controls 118, and output planned routes and instructions via the speaker 122 and the display 116. Location data that is needed for navigation may be collected from a global navigation satellite system (GNSS) controller 124 configured to communicate with multiple satellites and calculate the location of the vehicle 102. The GNSS controller may be configured to support various current and/or future global or regional location systems such as global positioning system (GPS), Galileo, Beidou, Global Navigation Satellite System (GLONASS) and the like. Map data used for route planning may be stored in the storage 106 as a part of the vehicle data 110. Navigation software may be stored in the storage 106 e.g. as a part of the vehicle applications 108.

The computing platform 104 may be configured to wirelessly communicate with a mobile device 140 of the vehicle users/occupants via a wireless connection 184 through a wireless transceiver 136. The mobile device 140 may be any of various types of portable computing device, such as cellular phones, tablet computers, smart watches, laptop computers, portable music players, or other device capable of communication with the computing platform 104. The wireless transceiver 136 may be in communication with a WiFi controller 128, a Bluetooth controller 130, a radio-frequency identification (RFID) controller 132, a near-field communication (NFC) controller 134, and other controllers such as a Zigbee transceiver, an IrDA transceiver (not shown), and configured to communicate with a compatible wireless transceiver (not shown) of the mobile device 140.

The computing platform 104 may be further configured to communicate various electronic control units (ECUs) 152 via one or more in-vehicle network 150. The in-vehicle network 150 may include, but is not limited to, one or more of a controller area network (CAN), an Ethernet network, and a media-oriented system transport (MOST), as some examples.

The ECUs 152 may include a telematics control unit (TCU) 154 configured to control telecommunication between vehicle 102 and a cloud 190 through a wireless connection 180 using a modem (not shown). Additionally or alternatively, the computing platform 104 may be configured to communicate with the cloud 190 via the mobile device 140 through a wireless connection 186. The computing platform 104 may be further configured to directly communicate with the cloud 190 via the wireless transceiver 136 using compatible protocols through a wireless connection 182. The cloud 190 may include one or more servers, or computers connected via various types of wired or wireless networks. It is noted that the term cloud is used as a general term throughout the present disclosure and may refer to any cloud-based services involving multiple servers, computers, devices and the like.

The ECUs 152 may further include a powertrain control module (PCM) 156 configured to monitor and control the powertrain operation of the vehicle 102. For instance, the PCM 156 may be configured to the stop/start of an engine (not shown), and/or the driving mode (e.g. economic, normal, or sport) of the vehicle 102. The ECUs 152 may further include a body control module (BCM) 158 configured to monitor and control body operations of the vehicle 102. For instance, the BCM 158 may be configured to control and monitor body functions such as door lock/unlock, seatbelt warning, vehicle occupancy, blind spot monitoring or the like using signals detected via one or more sensors 162. The sensors 162 may include any electronic, mechanical, magnetic, optical sensors or the like configured to communicate with various ECUs 152 to provide sensing signals. As a few non-limiting examples, the sensors 162 may include a vehicle weight sensor configured to measure the loading weight of the vehicle 102, a seatbelt latch sensor configured to detect seatbelt fasten status, a vehicle speed sensor configured to measure vehicle speed, a vehicle proximity sensor configured to measure a distance between the vehicle 102 and an object, a camera sensor configured to take image or video outside or inside the vehicle 102, one or more temperature sensors configured to measure an ambient and/or cabin temperature of the vehicle 102, and a vehicle fuel level sensor configured to measure fuel level of the vehicle 102.

The ECUs 152 may further include an electronic stability controls (ESC) 160 configured to monitor vehicle operation status using signals from the speed sensor 162 and control the stability of the vehicle operation whenever needed such as by activating anti-lock brakes (ABS), traction controls or the like. The ECUs 152 may further include an autonomous driving controller (ADC) 164 configured to monitor and control the autonomous driving features of the vehicle 102. Some autonomous driving feature may include lane keep assist, safe distance from other vehicles, cruise control, hands-off-wheel alert, autobraking, brake mitigation with multiple sensitivity levels or the like.

Figure 2:
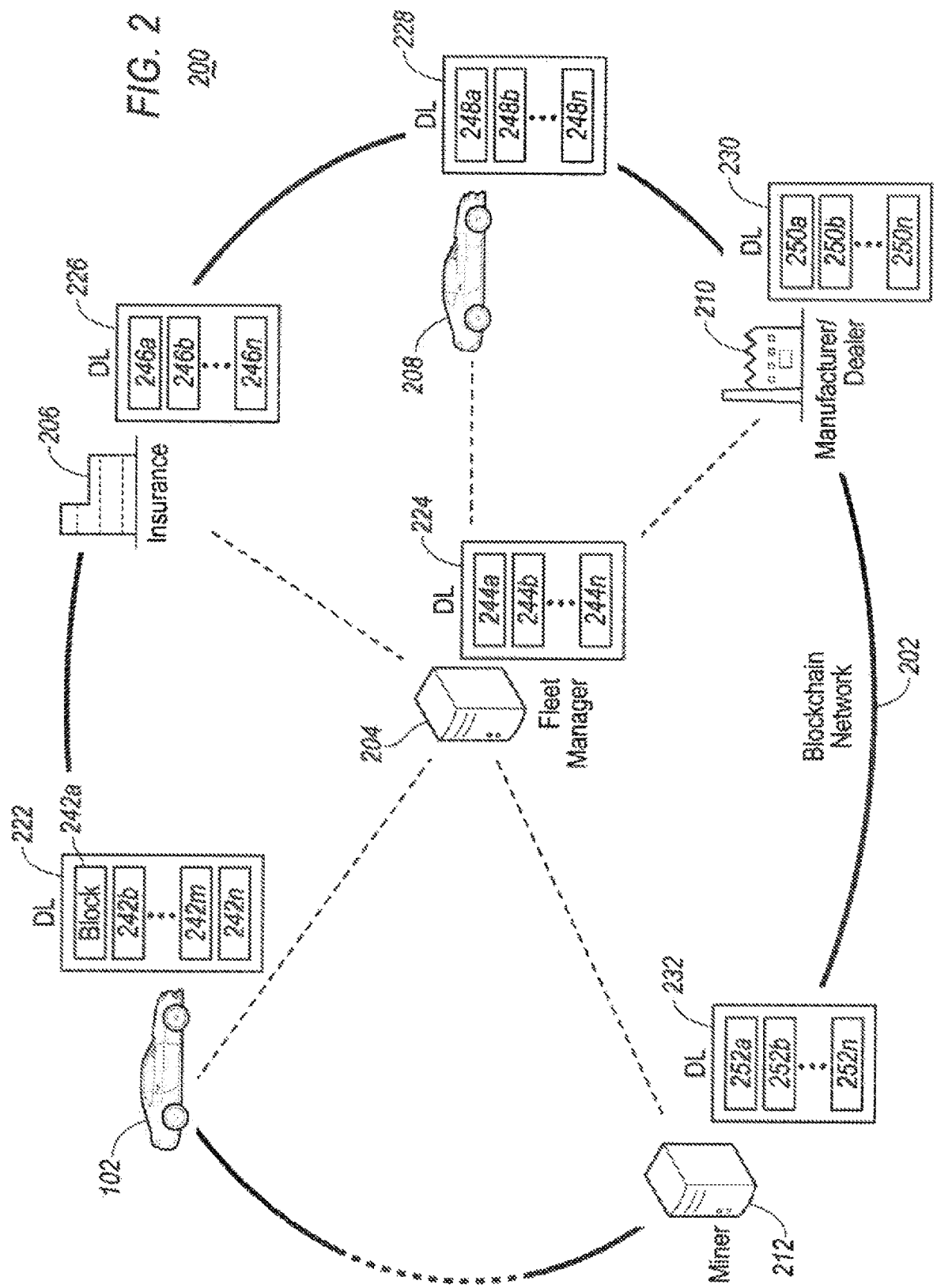
FIG. 2 illustrates an example blockchain topology diagram of one embodiment of the present disclosure.

Referring to FIG. 2, an example topology diagram 200 of a vehicle blockchain network 202 of one embodiment of the present disclosure is illustrated. The vehicle blockchain network 202 may be a peer-to-pear network having multiple nodes connected with each other. The vehicle 102 may be connected to the blockchain network 202 as a node via the various wireless connections 180, 182 and/or 186 through the cloud 190. The vehicle 102 may be connected to the blockchain network using a blockchain application stored in the storage 106 e.g. as one of the vehicle applications 108. For instance, the blockchain application may contain a smart contract business logic, legal rules, terms and conditions, and the like to control the blockchain network operations specified by a fleet manager 204 managing multiple fleet vehicles including the vehicle 102. Each node of the blockchain network 202 may be configured to maintain a distributed ledger (sometimes referred to as DL) individually within its own storage device. For instance, the vehicle 102 may be configured to maintain a distributed ledger 222 stored in the storage 106 e.g. as a part of the vehicle data 110. Each distributed ledger may include multiple blocks for data recordation purposes. Taking the distributed ledger 222 of the vehicle 102 for instance, the data chain included in the distributed ledger 222 may grow at a block-by-block basis. For instance, a successor block 242*b* may contain a cryptographic hash of a previous block 242*a*, a timestamp indicative of a time of creation of the successor block 242*b*, and transaction data stored to the successor block 242*b*. The same configuration may be implemented at other nodes of the blockchain network.

As an example, the vehicle 102 may be among a fleet including multiple peer vehicles such as a peer vehicle 208 that are managed by the fleet manager device 204. Both the peer vehicle 208 and the fleet manager 204 may be connected to blockchain network 202 as nodes each maintaining a distributed ledger 228 and 224 respectively. The blockchain network 202 may further include one or more insurance providers 206 for the vehicle 102 maintaining a distributed ledger 226, one or more vehicle manufacturers/dealers 210 of the vehicle 102 maintaining a distributed ledger 230, and one or more miner 212 maintaining a distributed ledger 232. It is noted that the blockchain network 202 illustrated with reference to FIG. 2 is merely an example and the blockchain network 202 may include more, fewer, or different nodes involving various parties illustrated or not illustrated in FIG. 2.

The topology of the vehicle blockchain network 202 may be applied to various situations. For instance, the fleet manager 204 may monitor fleet vehicles, including the vehicle 102 and the peer vehicle 208, using the blockchain network 202. Taking the vehicle 102 for example, blockchain connection software may be installed on the computing platform 104. In addition, the computing platform 104 may be configured with various predefined trigger events 138 for event detection and reporting. The computing platform 104 may be configured to record vehicle history of the vehicle 102 responsive to detecting a match of one or more trigger events via various vehicle sensors 162 and use the blockchain network 202 to record the event. Responsive to detecting a predefined trigger event 138 being matched, the computing platform 104 may be configured to broadcast the event to the entire or part of the blockchain network 202 and wait for a validation. The validation may be conducted by a variety of methods. For instance, the fleet manager 204 may validate the event using a predefined authentication code (e.g. a vehicle identification number (VIN)) sent with the event from the vehicle 102 to validate the authenticity of the event broadcast. Additionally or alternatively, one or more miners 212 serving as nodes of the blockchain network 202 may be used to validate the event from the vehicle 102 and calculate a key responsive to a successful validation. Responsive to successfully calculating the key, the miner 212 may broadcast the key to the entire or part of the blockchain network. Using the key received from the miner 212, each node of the blockchain network 202 involved in recording the event from the vehicle 102 may generate a new block from a previous block incorporating the event and add the new block to the distributed ledger. Taking the vehicle 102 for example, if the latest block in the distributed ledger is 242*m* when the event is detected and broadcasted, responsive to receiving the key from the miner 212, the computing platform 104 may generates a new block 242*n* based on the previous block 242*m* using the key and add the new block 242*n* into the distributed ledger 222. Similarly, the fleet manager 204 may add a new block 244*n* to the distributed ledger 224, the insurance provider 206 may add a new block 246*n* to the distributed ledger 226 and etc.

Figure 3:
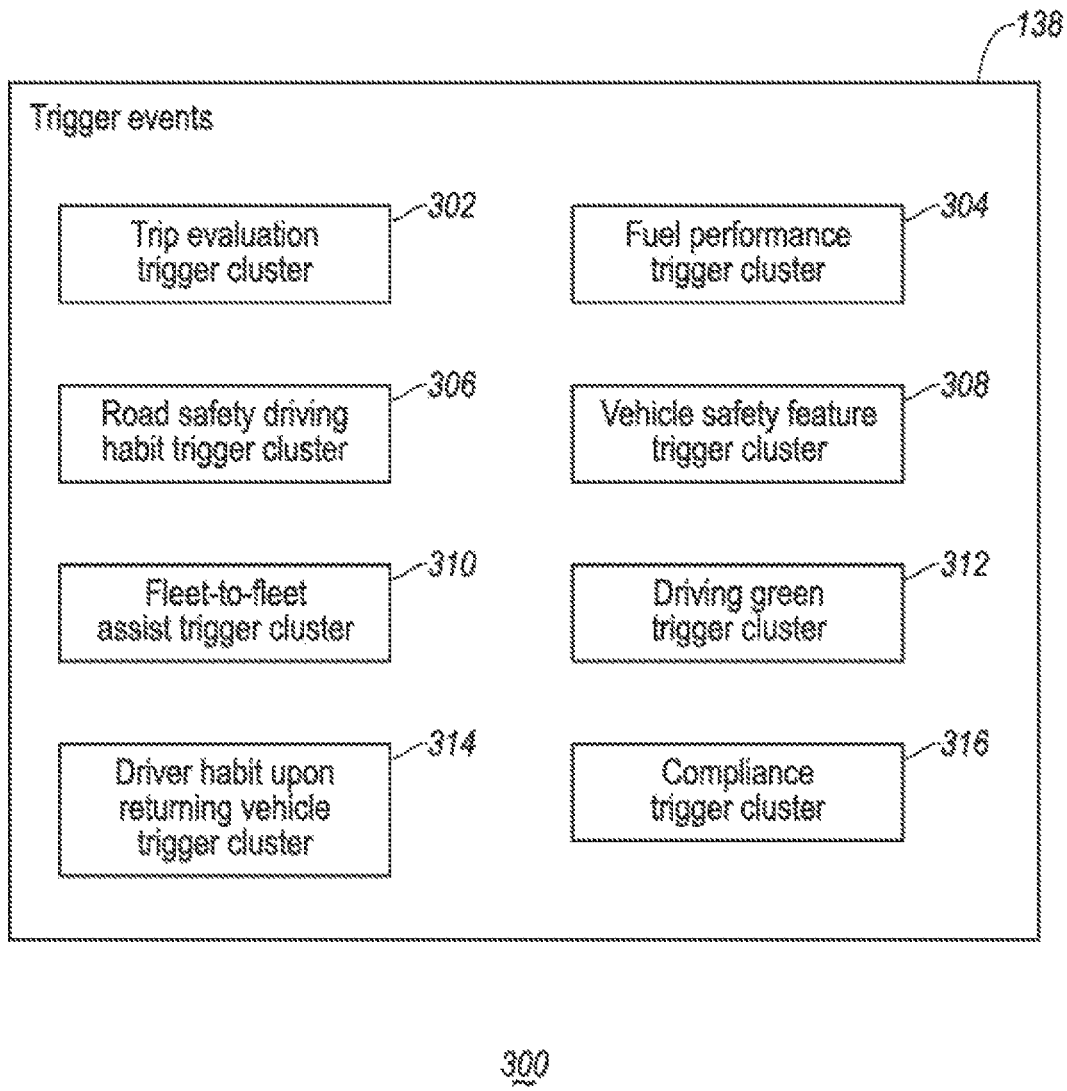
FIG. 3 illustrates an example block diagram of vehicle event triggers of one embodiment of the present disclosure.

Referring to FIG. 3, an example diagram 300 of multiple vehicle trigger events 138 of one embodiment of the present disclosure is illustrated. In the present embodiment, the vehicle 102 may be fleet vehicle for commercial use for passengers and/or cargos. The trigger events 138 may include a trip evaluation trigger cluster 302 e.g. indicative of hours of operation of the vehicle 102 against destinations completed. For instance, the trip evaluation trigger cluster 302 may further include a route to a destination calculated via the navigation controller 126. A predefined value for the route based on the distance to the destination (e.g. a 100 miles route may be assigned a value of $25) may be assigned. The trip evaluation trigger cluster 302 may further include a fuel reimbursement value per mile (e.g. $0.50 is paid per mile driven on the route) and route stops including a predefined value of each stop (e.g. $25 for each passenger stop and $10 for each cargo stop). The trip evaluation trigger cluster 302 may further include a trigger for continuous improvements on vehicle inspections, electronic logging devices (ELDs) trigger, trip reporting trigger, and driver maintaining good driver score trigger.

The trigger events 138 may further include a fuel performance trigger cluster 304 indicative of the fuel-economy of an operator operating the vehicle 102. The fuel performance trigger cluster 304 may include trigger for the stop/start system usage controlled by the PCM 156 which helps to improve the fuel-economy of the vehicle 102. The more often the operator uses the stop/start feature, the more incentive value may be added to the operator's payment. For instance, the fleet manager may reward the operator with a predefined incentive pay (e.g. $0.5) for each stop/start cycle controlled by the PCM 156. The fuel performance trigger cluster 304 may further include an engine idle trigger which is compared with a historic trip data for the same or different operator to determine the norm occurrences of engine idle for similar trip types operating the vehicle 102. An incentive pay may be given to the operator with a better (less frequent) engine idling record. The fuel performance trigger cluster 304 may further include a trigger for usage of air conditioning (AC) level in comparison to outside temperature. Similar to the engine idle trigger, the trigger for usage of AC may be compared with a historic trip data for the same or different operator to determine the norm of AC usage for similar outside temperature. An incentive pay may be given to the operator with a better (less frequent) AC usage at a similar outside temperature. The fuel performance trigger cluster 304 may further include a fuel-economy value trigger such as a miles-per-gallon value, and a tire pressure maintenance trigger to monitor the vehicle fuel performance based on signals received from a trip computer and/or a tire pressure sensor 162 for instance. An incentive pay may be given to the operator maintaining good fuel-economy and/or tire pressure.

The trigger events 138 may further included a road safety driving habit trigger cluster 306 designated to reward the operator of the vehicle 102 responsive to detecting road safety driving habits. The road safety driving habit trigger cluster 306 may include various factors related to driving safety. For instance, the road safety driving habit trigger cluster 306 may include a seatbelt usage trigger to monitor seatbelt usage based on signals received from a seatbelt sensor 162, and a lane changing turn signals usage trigger to monitor the vehicle operation based on signals received from the camera 162 and an indictor switch sensor 162. The road safety driving habit trigger cluster 306 may further include a trigger for keeping safety distance from other vehicles using data received from the camera 162 or a proximity sensor 162. The road safety driving habit trigger cluster 306 may further include a bad weather speed reducing trigger to monitor the vehicle operation in slippery, wet or low visibility conditions based on weather data received via the TCU 154 from the cloud 190. Additionally or alternatively, the temperature sensor, vehicle speed sensor, the ESC 160 may further provide data to the computing platform 104 to detect the bad weather speed reducing trigger being matched.

In some countries or states, the law requires commercial fleet drivers to take a break after a certain duration of driving. Therefore, the road safety driving habit trigger cluster 306 may further include a break trigger to monitor the vehicle operator based on data received from the GNSS controller 124, vehicle trip departure and stopping time or the like. The road safety driving habit trigger cluster 306 may further include a driving on speed limit trigger and low visibility headlight usage trigger to monitor the vehicle operation based on data from a speed sensor 162 and a light sensor 162. Sometimes high volume of the speaker 122 may have negative impact for vehicle safety. The road safety driving habit trigger cluster 306 may further include a moderate volume level trigger for the speaker 122.

The vehicle 102 may be provided with various advanced safety features such as blind spot monitoring. The trigger events 138 may further include a vehicle safety feature trigger cluster 308 designated to reward the vehicle operation for using those vehicle safety features. The vehicle safety feature trigger cluster 308 may include a blind spot monitor usage trigger and cruise control usage trigger to monitor the usage of those safety features based on data received from the BCM 158 and the ADC 164 respectively. The vehicle safety feature trigger cluster 308 may further include a trigger for lane keep assist sensitivity maintaining and lane warning, and a cruise control usage trigger to monitor the usage of those features based on signals received from the ADC 164. The vehicle safety feature trigger cluster 308 may further include a hands-off-wheel alert maintaining trigger, a hands-free phone call mode usage trigger, and a brake mitigation sensitivity level maintaining trigger based on data received from the ADC 164 and TCU 154.

The trigger events 138 may further include a fleet-to-fleet assist trigger cluster 310 designated to incentivize vehicle operators to assist another member of the fleet beyond his/her own route to meet customer goals. For instance, the fleet-to-fleet assist trigger cluster 310 may include trigger for picking up load (passenger or cargo) from another fleet vehicle or location out of route, and a trigger for stopping to render assistance to a fellow fleet inoperative (e.g. due to a flat tire). Data required for these two triggers may include current location from the GNSS controller 124 and destination target location transmitted received from the TCU 154. The computing platform 104 of the vehicle 102 may be further configured to communicate with the fleet manager 204 via software stored in the storage 106 to receive instructions to render assistance. The fleet-to-fleet assist trigger cluster 310 may further include a trigger for driving the vehicle for repair upon observing a diagnostic trouble code (DTC). For instance, this trigger may be matched by changing the route to a repair shop within a predefined time period (e.g. 10 minutes) after the DTC is reported to the operator.

The trigger events 138 may further include a driving green trigger cluster 312 designated to encourage more eco-friendly operation of the vehicle 102. The driving green trigger cluster 312 may include a low ethanol fuel trigger which provides incentive pay to the operator for filling up the fuel tank with lower grade of ethanol (e.g. 10% or less). The driving green trigger cluster 312 may further include a fleet route optimization trigger to provide incentive pay to the operator to perform multiple load and unload with one fleet vehicle based on data received from the navigation controller 126 and the GNSS controller 124. The driving green trigger cluster 312 may further include an electric vehicle (EV) usage trigger which provides incentive pay to the operator for using EVs instead of vehicles powered by conventional fossil fuel. The driving green trigger cluster 312 may further include a trigger for charging EV at off-peak hours which provides incentive pay to the operator for charging the electric vehicle during predefined off-peak hours (e.g. from 10 pm to 7 am). The driving green trigger cluster 312 may further include a trigger for reporting road/infrastructure issues such as a road work or accident by uploading a picture/video captured by the camera 162 together with the location from the GNSS controller 124 to the cloud 190 via the TCU 154.

The trigger events 138 may further include a driver habit upon returning vehicle trigger cluster 314 designated to encourage good habits for the next trip. For instance, the driver habits upon returning vehicle trigger cluster 314 may include a trigger for the operator to perform a vehicle maintenance checklist after the vehicle is parked. The checklist may include checking tire pressure for each tire, engine oil, DTC scan or the like. The computing platform may detect the checklist being performed such as by detecting the vehicle hood is opened after the vehicle 102 has been parked or the like. Alternatively, the computing platform 104 may allow the operator to manual input the checklist via the HMI controls 118. The driver habits upon returning vehicle trigger cluster 314 may further include a reverse parking trigger to monitor the parking orientation of the vehicle 102 using data from the vehicle camera 162 and proximity sensor 162 to provide incentive pay for reserve parking. The driver habits upon returning vehicle trigger cluster 314 may further include a fuel tank percentage trigger to monitor the vehicle fuel level based on data from the fuel gauge sensor 162 to provide incentive pay to the operator fueling up the tank for the next trip before parking.

In many states or countries, there are laws regulating the operation of commercial vehicle such as ELD and vehicle weight requirements. The trigger events 138 may further include a regulation compliance trigger cluster 316 to encourage the operator to comply with the regulations. Additionally or alternatively, the regulation compliance trigger cluster 316 may further be used for law enforcement purposes by granting access to such recorded trigger data to the law enforcement agencies. As a few non-limiting examples, the compliance trigger cluster 316 may include an ELD trigger designated to track the vehicle operating time by a specific operator, a vehicle weight trigger designated to check the vehicle weight based on signals from a weight sensor 162, a hours of operation trigger designated to inspect vehicle safety after specific hours of operation, a tire pressure trigger designated to verify appropriate tire pressure via one or more tire pressure sensors 162, a brake depth trigger designated to verify sufficient brake pad depth via one or more brake sensors 162, and a seatbelt status trigger designated to verify the operator or passengers are using seatbelt as required by law via one or more seatbelt sensors.

Figure 4:
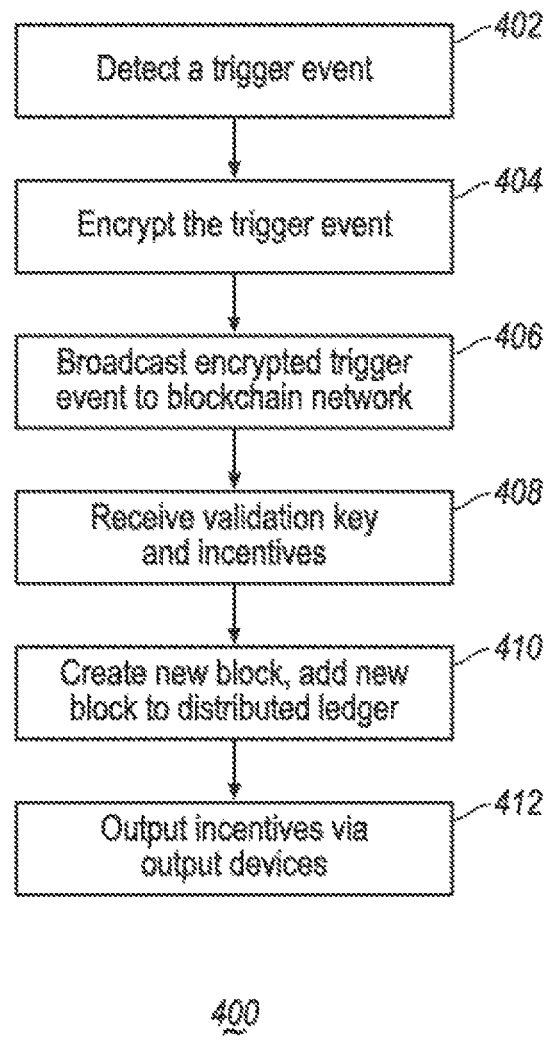
FIG. 4 illustrates an example flow diagram for a process of one embodiment of the present disclosure.

Referring to FIG. 4, an example flow diagram for a process 400 of one embodiment of the present disclosure is illustrated. With continuing reference to FIGS. 1-3, at operation 402, the computing platform 104 of the vehicle 102 detects a trigger event 138 with at least one trigger being matched. For instance, the trigger event 138 may be any one or more among the trigger events 138 illustrated with reference to FIG. 3 detected via one or more sensors 162, ECUs 152 and/or any other components of the vehicle 102. Responsive to detecting the trigger event 138, the computing platform 104 performs encryption on the trigger event 138 to generate an encrypted trigger event at operation 404. An identification or a key (e.g. the VIN of the vehicle 102) may be used for encryption purposes. At operation 406, the computing platform 104 broadcasts the encrypted trigger event to the blockchain network 202 for validation. As discussed previously with reference to FIG. 2, responsive to receiving the encrypted trigger event from the vehicle 102, the fleet manager 204 may perform validation. Alternatively, the validation may be performed elsewhere e.g. via a miner 212 as a node of the blockchain network 202. Responsive to a successful validation, the fleet manager 204 or the miner 212 may broadcast a validation key to the blockchain network 202. Additionally, depending on the specific trigger event, the fleet manager 204 or the miner 212 may further generate an incentive reward and send along with the validation key to the blockchain network 202. Responsive to receiving the validation key at operation 408, at operation 410, the computing platform 104 creates a new block incorporating the detected trigger event based on a previous block e.g. via hash algorithm, and add the block to the distributed ledger 222 stored in the storage 106. In case that a reward is received along with the validation key, at operation 412, the computing platform 104 further output the incentive reward to the operation e.g. via the display 116 and/or the speaker 122.

The process 400 may be applied to various situations. For instance, one or more trigger events 138 may be used to provide incentive pay to an operation for the vehicle 102 to encourage good driving behavior. Taking the lane changing turn signal usage trigger of the road safety driving habit trigger cluster 306 for example, responsive to detecting the operator consistently used turn signal when changing lanes over a predefined period of time (e.g. 30 minutes) or a predefined distance of driving (e.g. 30 miles), the computing platform 104 may send the lane changing turn signal usage trigger event to the blockchain network 202 to report the good driving habit of the operator. And responsive to receiving a successful validation together with an incentive result (e.g. $5 extra pay), the computing platform 104 may output the incentive result to the operator to encourage continuous good driving.

In another example, the fleet manager 204 may subscribe to a driving green program sponsored by government or other organizations. The fleet manager 204 may configure one or more fleet vehicles 102 with the driving green trigger cluster 312 and only share data related to the driving green trigger 312 category with the sponsors for reimbursement or tax deduction purposes or the like. Other categories of trigger events 138 such as the trip evaluation trigger 302 may not be shared with the sponsors. Similarly, the fleet manager 204 may grant certain categories of trigger events stored in the distributed ledgers among the blockchain network 202 to the insurance provider 206 for premium discount calculation. For example, the fleet manager 204 may share block data for the road safety driving habit trigger cluster 306 and vehicle safety feature trigger cluster 308 with the insurance provider 206, and prohibit access to other categories of trigger events 138 without special approval. It is noted that, the insurance provider 206 as a node of the blockchain network may still have other categories of trigger events 138 stored in the distributed ledger 226 as blocks 246. However, the insurance provider 206 may not decrypt the block data without a key granted by the fleet manager 204.

The present disclosure may be further applied to law enforcement context. For instance, the fleet manager 204 may grant access to certain categories of trigger events data such as the compliance trigger cluster 316 to a law enforcement agency (e.g. a police department) allowing the agency to exam and inspect the compliance status (e.g. load weight) of the fleet vehicle 102 without having to stop the vehicle 102. In this way, the present disclosure provides a more convenient solution to both the fleets and the law enforcement agency.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle manager server, comprising:
an interface configured to connect the vehicle manager server to a blockchain network having a plurality of nodes including a vehicle, a first entity, and a second entity, wherein each node stores a distributed ledger; and
a processor, programmed to
responsive to receiving a plurality of trigger events of a first cluster broadcasted by the vehicle to the blockchain network, encrypt the plurality of trigger events of the first cluster to generate first encrypted data,
store the first encrypted data in the distributed ledger stored on each of the plurality of nodes,
responsive to receiving a first request from the first entity to access the first encrypted data corresponding to the plurality of trigger events of the first cluster stored in the distributed ledger, send a first key corresponding to the first encrypted data to the first entity to allow access to the plurality of trigger events of the first cluster, responsive to receiving a plurality of trigger events of a second cluster broadcasted by the vehicle to the blockchain network, encrypt the plurality of trigger events of the second cluster to generate second encrypted data, store the second encrypted data in the distributed ledger stored on each of the plurality of nodes, responsive to receiving a second request from the first entity to access the second encrypted data corresponding to the plurality of trigger events of the second cluster stored in the distributed ledger of the first entity, decline the second request, and responsive to receiving a third request from the second entity to access the second encrypted data corresponding to the plurality of trigger events of the second cluster, send a second key corresponding to the second encrypted data to the second entity to allow access to the plurality of trigger events of the second cluster, wherein the first entity is an insurance entity providing a coverage to the vehicle, and the second entity is a law enforcement entity.

2. The vehicle manager server of claim 1, wherein the first cluster is a vehicle safety features cluster including a plurality of trigger events correspond to: a seatbelt usage pattern trigger, a lane changing turn signals usage trigger, a trigger for keeping safety distance from other vehicles, and a moderate volume level trigger classified.

3. The vehicle manager server of claim 2, wherein the vehicle safety features cluster further includes a plurality of trigger events corresponding to: a blind spot monitor usage trigger, a cruise control usage trigger, a trigger for lance keep assist sensitivity maintaining and lane warning, a cruise control usage trigger, a hands-off-wheel alert maintaining trigger, and a hands-free phone call mode usage trigger.

4. The vehicle manager server of claim 1, wherein the second cluster is a compliance cluster including a plurality of trigger events corresponding to:
an electronic logging devices trigger, a vehicle weight trigger, and an hours of operation trigger.

5. The vehicle manager server of claim 4, wherein the compliance cluster further includes a plurality of trigger events corresponding to: a tire pressure trigger, a brake depth trigger, and a seatbelt status trigger.

6. A method for a server in communication with a blockchain network having a plurality of nodes including a vehicle, a first entity each storing a distributed ledger, the method comprising:
receiving a plurality of trigger events of a first cluster broadcasted by the vehicle to the blockchain network;
encrypt the plurality of trigger events of the first cluster to generate first encrypted data;
store the first encrypted data in the distributed ledger stored on each of the plurality of nodes;
receiving a first request from the first entity to access the first encrypted data corresponding to the plurality of trigger events of the first cluster;
sending a first key to the first entity to decrypt the first encrypted data corresponding to the plurality of trigger events of the first cluster;
receiving a plurality of trigger events of a second cluster broadcasted by the vehicle to the blockchain network;

encrypt the plurality of trigger events of the second cluster to generate second encrypted data;
store the second encrypted data in the distributed ledger stored on each of the plurality of nodes;
receiving a second request from the first entity to access the second encrypted data corresponding to the plurality of trigger events of the second cluster; and
declining the second request,
wherein the first entity is an insurance entity providing a coverage to the vehicle, and the second entity is a law enforcement entity.

7. The method of claim 6, wherein the plurality of nodes further includes a second entity, the method further comprising:
receiving a third request from the second entity to access the plurality of trigger events of the second cluster; and
sending a second key to the second entity to allow access to the plurality of trigger events of the second cluster.

8. The method of claim 6, wherein the first cluster is a vehicle safety features cluster including a plurality of trigger events correspond to: a seatbelt usage pattern trigger, a lane changing turn signals usage trigger, a trigger for keeping safety distance from other vehicles, and a hands-free phone call mode usage trigger.

9. The method of claim 6, wherein the second cluster is a compliance cluster including a plurality of trigger events corresponding to: to an electronic logging devices trigger, a vehicle weight trigger, and seatbelt status trigger.

10. A server, comprising:
an interface configured to communicate with a blockchain network having a plurality of nodes including a vehicle, and a first entity, wherein each node stores a distributed ledger; and
a processor, programmed to
receive a plurality of trigger events of a first cluster broadcasted by the vehicle to the blockchain network,
encrypt the trigger events of the first cluster into first encrypted data;
store the first encrypted data in the distributed ledger stored on each of the plurality of nodes,
receive a first request from the first entity to access the first encrypted data corresponding to the plurality of trigger events of the first cluster,
send a first key corresponding to the first encrypted data to the first entity, receive a plurality of trigger events of a second cluster broadcasted by the vehicle to the blockchain network,
encrypt the trigger events of the second cluster into second encrypted data;
store the second encrypted data in the distributed ledger stored on each of the plurality of nodes,
receive a second request from the first entity to access the second encrypted data corresponding to the plurality of trigger events of the second cluster, and
decline the second request,
wherein the first entity is an insurance entity providing a coverage to the vehicle, and the second entity is a law enforcement entity.

11. The server of claim 10, wherein the plurality of nodes further includes a second entity, and the processor is further programmed to:
receive a third request from the second entity to access the plurality of trigger events of the second cluster, and
send a second key to the second entity to allow access to the plurality of trigger events of the second cluster.

12. The server of claim 10, wherein the first cluster is a vehicle safety features cluster including a plurality of trigger events correspond to: a seatbelt usage pattern trigger, a lane changing turn signals usage trigger, a trigger for keeping safety distance from other vehicles, and a moderate volume level trigger classified.

13. The server of claim 10, wherein the second cluster is a compliance cluster including a plurality of trigger events corresponding to: to an electronic logging devices trigger, a vehicle weight trigger, and an hours of operation trigger.

\* \* \* \* \*